US005973331A

United States Patent [19]

Stevens et al.

[11] Patent Number: 5,973,331

[45] Date of Patent: Oct. 26, 1999

[54] LAMP ASSEMBLY

[75] Inventors: Philip Stevens, Farnham; Patrick Keogh, Windsor, both of United Kingdom

[73] Assignee: Nordson Corporation, Westlake, Ohio

[21] Appl. No.: 08/903,842

[22] Filed: Jul. 31, 1997

[30] Foreign Application Priority Data

Aug. 2, 1996 [GB] United Kingdom .................. 9616311

[51] Int. Cl.[6] .............................................. G02B 5/10

[52] U.S. Cl. .............................. 250/492.1; 250/504 R

[58] Field of Search ........................ 250/492.1, 504 R, 250/493.1; 359/858, 859, 864, 865, 866, 867, 868, 869; 34/266, 275

[56] References Cited

U.S. PATENT DOCUMENTS

| | | | |
|---|---|---|---|
| 4,434,562 | 3/1984 | Bubley | 34/3 |
| 4,798,960 | 1/1989 | Keller et al. | 250/504 R |
| 5,094,010 | 3/1992 | Jacobi et al. | 250/504 R |
| 5,204,534 | 4/1993 | Dubuit | 250/492.1 |
| 5,712,487 | 1/1998 | Adachi et al. | 250/492.1 |
| 5,788,940 | 8/1998 | Cicha et al. | 250/504 R |

FOREIGN PATENT DOCUMENTS

| | | |
|---|---|---|
| 0008004 | 2/1980 | European Pat. Off. . |
| 0324467 | 7/1989 | European Pat. Off. . |
| 467411 | 12/1936 | United Kingdom . |
| 547661 | 3/1942 | United Kingdom . |
| 596354 | 7/1945 | United Kingdom . |
| 595542 | 8/1946 | United Kingdom . |
| 884068 | 12/1961 | United Kingdom . |
| 895148 | 5/1962 | United Kingdom . |
| 1169052 | 5/1964 | United Kingdom . |
| 979987 | 1/1965 | United Kingdom . |
| 1071638 | 6/1967 | United Kingdom . |
| 1105153 | 3/1968 | United Kingdom . |
| 1115928 | 6/1968 | United Kingdom . |
| 1123392 | 8/1968 | United Kingdom . |
| 1234846 | 6/1971 | United Kingdom . |
| 1408955 | 10/1975 | United Kingdom . |
| 1499770 | 2/1978 | United Kingdom . |
| 2009384 | 6/1979 | United Kingdom . |
| 2024393 | 1/1980 | United Kingdom . |
| 2208424 | 3/1989 | United Kingdom . |

*Primary Examiner*—Kiet T. Nguyen
*Attorney, Agent, or Firm*—Rankin, Hill, Porter, & Clark LLP

[57] ABSTRACT

A lamp assembly has an elongate source of radiation and an elongate reflective surface partly surrounding the source for reflecting radiation from the source onto a substrate for curing a coating on the substrate. The reflective surface has a profile which is substantially continuously concave curved and is shaped with respect to the source such that less than 10% of the radiation emitted from the source is reflected back onto the source.

31 Claims, 11 Drawing Sheets

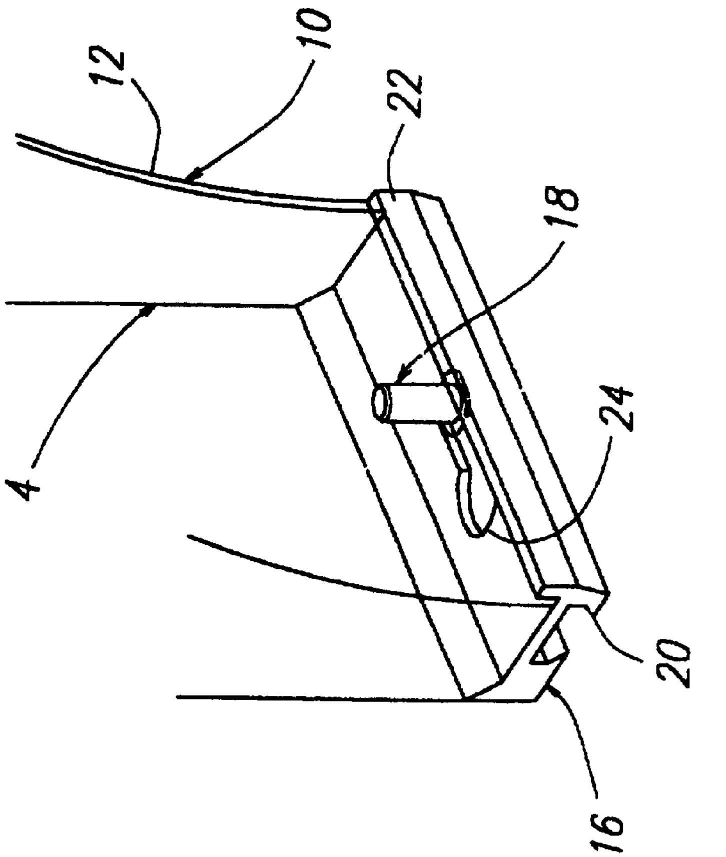
FIG. 2
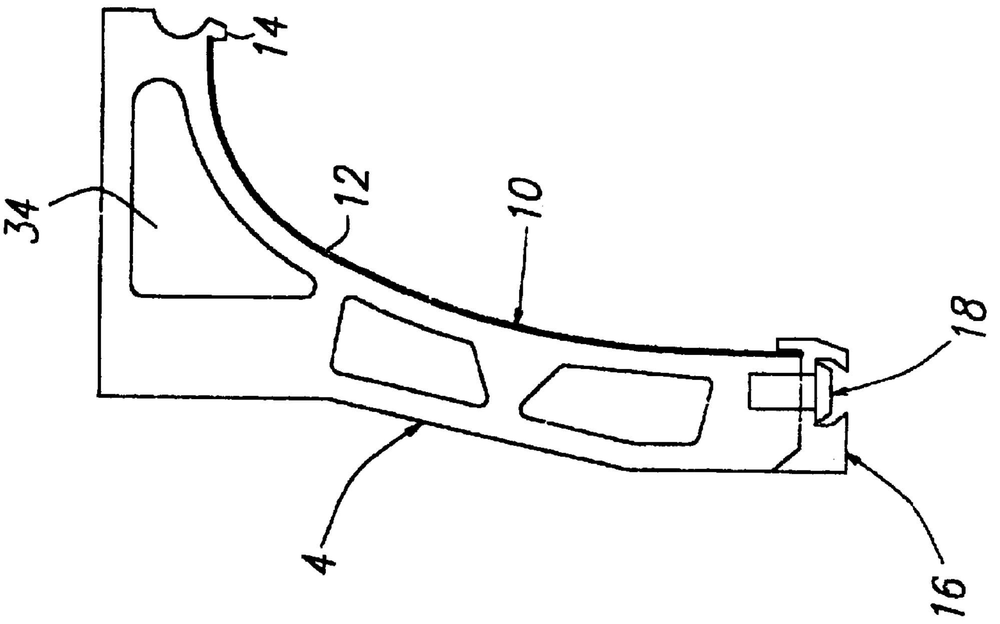

LAMP ASSEMBLY

BACKGROUND OF THE INVENTION

This invention relates to lamp assemblies, and more particularly to lamp assemblies for use in the printing and coating industry for the fast curing of inks and the like on a large variety of substrate materials. During the curing process, the substrate is moved in a path beneath an elongate lamp assembly so that a coating on the substrate is irradiated by radiation from the lamp to cure the coating in a continuous process. The substrate may be continuous or comprise multiple sheets which are fed past the lamp in succession.

It is well known to cure inks on a substrate by application of ultra-violet radiation from one or more medium-pressure mercury vapor ultra-violet lamps. It is also well known to provide each lamp in an assembly with a reflector which includes a reflective surface partly surrounding the lamp for reflecting radiation therefrom onto the substrate. The reflective surface has a concave profile which is commonly elliptical or parabolic, the lamp being mounted on the symmetrical center line of the profile and adjacent the apex.

The reflector increases the intensity of the radiation received by the curable material. The penetration of the radiation into the material is an important factor in curing and, whilst penetration varies with different colors and materials, the higher the intensity the better the penetration.

A problem which arises with known arrangements is that part of the radiation is reflected back onto the lamp itself, which reduces the amount of radiation energy available for curing and leads to heating of the lamp which can adversely affect lamp operation and increase the already large amount of heat given off by the assembly which may cause warping and distortion of the coating and/or the substrate.

This problem has been recognized in French Patent 2334966 which describes a reflector in the form of two half-shells, each of which is pivotal about a longitudinal axis within the cavity to the sides of the symmetrical center line thereof. The French Patent proposes deforming the top region of the reflector to give it, externally, a generally concave shape across the width of the lamp by bending the top edge of each half-shell down towards the lamp.

The apparatus disclosed in French Patent 2334966 has disadvantages as a result of its basic form in that a complicated system will be necessary to achieve the desired pivoting action and space has to be provided to accommodate the half-shell pivoting which is inconsistent with the current industry desire for smaller curing assemblies. Cooling of the half-shells will be difficult, again because of the need to accommodate the pivoting action. Problems will also arise as a result of the solution proposed in the French Patent to the problem of lamp self-heating. The distortion of the reflector towards the lamp will lead to excessive heating of the distorted portion and will make cooling of the adjacent region of the lamp much more difficult.

The efficient and effective cooling of lamp assemblies has been a constant problem which has become even more important as ever increasing lamp powers have been employed to give faster curing such that substrate speeds can be increased. For example, at the date of the French Patent, 1975, lamp powers were only in the region of 250 Watts per inch (100 Watts per cm). Lamp powers of 200–400 Watts per inch (80–160 Watts per cm) are now common and lamps of even higher powers, 500–600 Watts per inch (200–240 Watts per cm) are increasingly being used. Furthermore, the advantages of UV curing, including cleanness and quality, have led to a demand for curing systems capable of operating with a wide variety of substrates, including substrates which are very vulnerable to heat damage.

Earlier assemblies were generally cooled by air alone. In the first air-cooled systems, air was extracted from within the reflector through one or more openings provided above the lamp to draw out the heat. In later systems, cooling air was blown into the assembly and onto the lamp, again through openings located adjacent the lamp. A problem with air cooling is that the blowers required increase the size of the assembly making it difficult to install between the stands of a multi-stand press.

This, and the increasing cooling requirements due to higher lamp powers, led to the use of water cooling alone or in conjunction with air cooling. The cooling water is fed through tubes attached to or integrally formed in the reflector. In addition, a number of designs have been proposed with filters comprising one or two tubes of quartz provided between the lamp and the substrate through which liquid is passed, typically distilled de-ionized water. As well as contributing to the cooling, the filters have the primary effect of filtering infra-red radiation, which tends to heat the substrate, and focusing the light from the lamp onto the substrate. The liquid coolant is circulated to and from all the tubes through cooling or refrigerating means.

As lamp powers increase, ever more efficient and effective cooling systems are required to keep temperatures within acceptable limits, not only to prevent damage to the substrate, but also to prevent harm to adjacent equipment and to operators of the printing system.

One known design of lamp assembly has a reflector in the form of a block with a cavity on the surface of which the reflective surface is provided. The reflective surface may be formed by polishing the cavity surface or a specific reflector member can be attached thereto. In either case it is known to provide coatings on the reflective surface of heat-absorbing material. To allow air cooling when a separate reflector member is employed, it is necessary to punch one or more holes through the member to provide a connection to the air flow passage or passages. With an integral reflector on the other hand, damage—to the reflective surface requires replacement of the block with consequent disconnection and reconnection to the cooling fluid supplies.

SUMMARY OF THE INVENTION

It is a general object of the present invention to provide a lamp assembly which overcomes one or more of the problems associated with known assemblies, as discussed above. It is a more particular object to provide a lamp assembly in which heat generation is reduced. It is a further particular object to provide a lamp assembly with a more efficient cooling system, specifically a more effective air cooling system. It is a still further particular object to provide a lamp assembly with a reflector member which can quickly and easily be replaced.

A lamp assembly, in accordance with a first aspect of the invention, comprises an elongate source of radiation and an elongate reflective surface partly surrounding the source for reflecting radiation from the source onto a substrate for curing a coating thereon, wherein the reflective surface has a profile which is substantially continuously concave-curved and is shaped with respect to the source such that less than 10% of the radiation emitted from the source is reflected back thereonto.

The advantage of this is that energy loss and self-heating of the lamp are reduced but, by making the reflective surface profile continuously concave-curved, the problems of excess heating and difficulty of lamp cooling which would arise with the arrangement of prior French Patent 2334966 are avoided. The profile is shaped to minimize the reflected radiation back onto the lamp which results in a deviation from the common elliptical and parabolic shapes of known reflectors.

A lamp assembly, in accordance with another aspect of the invention, comprises an elongate source of radiation and an elongate reflective surface partly surrounding the source for reflecting radiation from the source onto a substrate for curing a coating thereon and two filters located between the source and the substrate wherein the reflective surface has a profile which is shaped to define two focal points for reflected light on either side of the radiation source and wherein the focal points are positioned with respect to the filters such that substantially all the light from the focal points passes to the substrate through the filters.

In a particularly preferred embodiment, the two aspects are combined. The shaping is, therefore, such that reflected rays, from the upper portion of the lamp, converge on either side of the lamp to give, in effect, two extra line sources. This, in turn, has the effect of widening the region of highest intensity along the substrate which can allow substrate speeds to be increased. There is a corresponding decrease in the energy intensity directly below the lamp. This improves filtering efficiency with the common filter configuration of two parallel tubes between the lamp of the substrate because more of the radiation passes through the filters and less passes therebetween.

When filters are employed, the reflective surface profile is shaped, particularly the middle portions thereof, to direct as much reflected radiation as possible through the filters. Furthermore the shaping, particularly of the upper portion, is such as to position the focal points with respect to the filters such that substantially all the light from the focal points passes to the substrate through the filters. Filtering efficiency in terms of reduction of infra-red radiation is maximized, as is the refraction of the reflected light. With two focal points focusing reflected light onto the filters, it has been found that it is possible to broaden still further the region of maximum radiation intensity because the two focal points with filters produce four maximums with only slight reductions therebetween. This allows for a still further increase in substrate speed whilst still ensuring proper curing.

A lamp assembly, in accordance with a further aspect of the invention, comprises an elongate radiation source, an elongate reflective surface partly surrounding the source for reflecting radiation from the source onto a substrate for curing a coating thereon, means for supplying cooling air to the source and means for generating an air vortex adjacent the source such that cooling air flows around the source.

A problem with known air cooling systems is that the air flow is not across the whole lamp so that, consequently, part of the lamp is subject to less cooling than the remainder. By the arrangement in which a vortex is generated, the air can be caused to swirl and eddy around the complete lamp circumference in the case of a tubular lamp. This increase cooling efficiency and, therefore, lamp efficiency as well as prolonging lamp life.

The vortex generation means may comprise an angled air supply passage for directing cooling air tangentially to a tubular radiation source on one side of the source. It is important for achievement of the desired air flows that the feed is to one side only. Alternatively, or additionally, the vortex generation means may comprise the reflective surface which has a profile configured to form the air vortex. Further alternatively, or additionally, the vortex generation means may include at least one filter positioned between the light source and the substrate, the or each filter being shaped and located to generate the air vortex. The combination is most preferred as it has been found that this leads to the most desirable air flows and consequent cooling.

The lamp assembly may be of the type having a reflector body with a cavity in which the source is located, the reflective surface being provided on the cavity surface.

In accordance with a still further aspect of the invention, this type of lamp assembly has a reflective surface which is provided by two reflector elements removably secured to the body either side of a symmetrical center line of the cavity. The reflector elements may comprise plates which are secured to the cavity surface by clamps and thereby caused to conform to the profile of the cavity surface. Each plate may be held between a flange extending into the cavity and a clamp attached to an end of the reflector cavity adjacent the substrate by fastening means.

The use of two reflector elements makes the reflector as a whole simpler to fit than if a single part reflector is employed. The clamps further facilitate fitting, particularly if these are of the quick-release type, and ensure good contact between the reflector elements and the reflector body. This, in turn, means that cooling which is provided for the reflector body will be effective in removing heat from the reflector.

The use of a separate reflector as opposed to polishing the cavity surface as in some known arrangements has the advantage that it avoids replacing the whole reflector body if the reflective surface is damaged. Repair and replacement are facilitated even further by the splitting of the separate reflector into two elements.

A further advantage of the use of two reflector elements is that these may be positioned to define a gap therebetween which is in communication with an opening connecting the cavity to an elongate air supply bore so that the gap then forms part of a supply means. The need to punch holes within a reflector to provide for air supply, as in known assemblies with single part reflectors, is avoided. The gap also leads to a reduction in radiation reflected back onto the source.

The opening which may in the reflector body or in an air flow tube may be situated to one side of the symmetrical center line of the cavity. The opening will, therefore, constitute the angled air supply passage of the first embodiment of vortex generating means described above.

The reflector body may include a plurality of channels for the passage of coolant liquid, at least one of which is positioned adjacent each of the cavity ends to cool the cavity sides. This has been found to be important because the maximum temperatures arise at the ends of the cavity and these may exceed safe levels for operators. By water cooling the sides, it has been found possible even with high lamp powers to keep the outside surface temperature within acceptable levels.

The reflector body is preferably of the type which is fixed in position within a housing. In some known arrangements the ref lector body or a part or parts thereof is moveable to stop or reduce radiation transmission to the substrate. A fixed body is preferred as this can be of dimensions to include integral coolant channels and coolant supply is facilitated. The reflector body is suitably a monolithic block which is formed by extrusion from a suitable material such as aluminum.

BRIEF DESCRIPTION OF THE DRAWINGS

The invention will now be further described by way of example with reference to the accompanying drawings in which:

FIG. 2 is a perspective view showing a clamp forming part of the assembly of FIG. 1;

DESCRIPTION OF THE PREFERRED EMBODIMENTS

Figure 1:
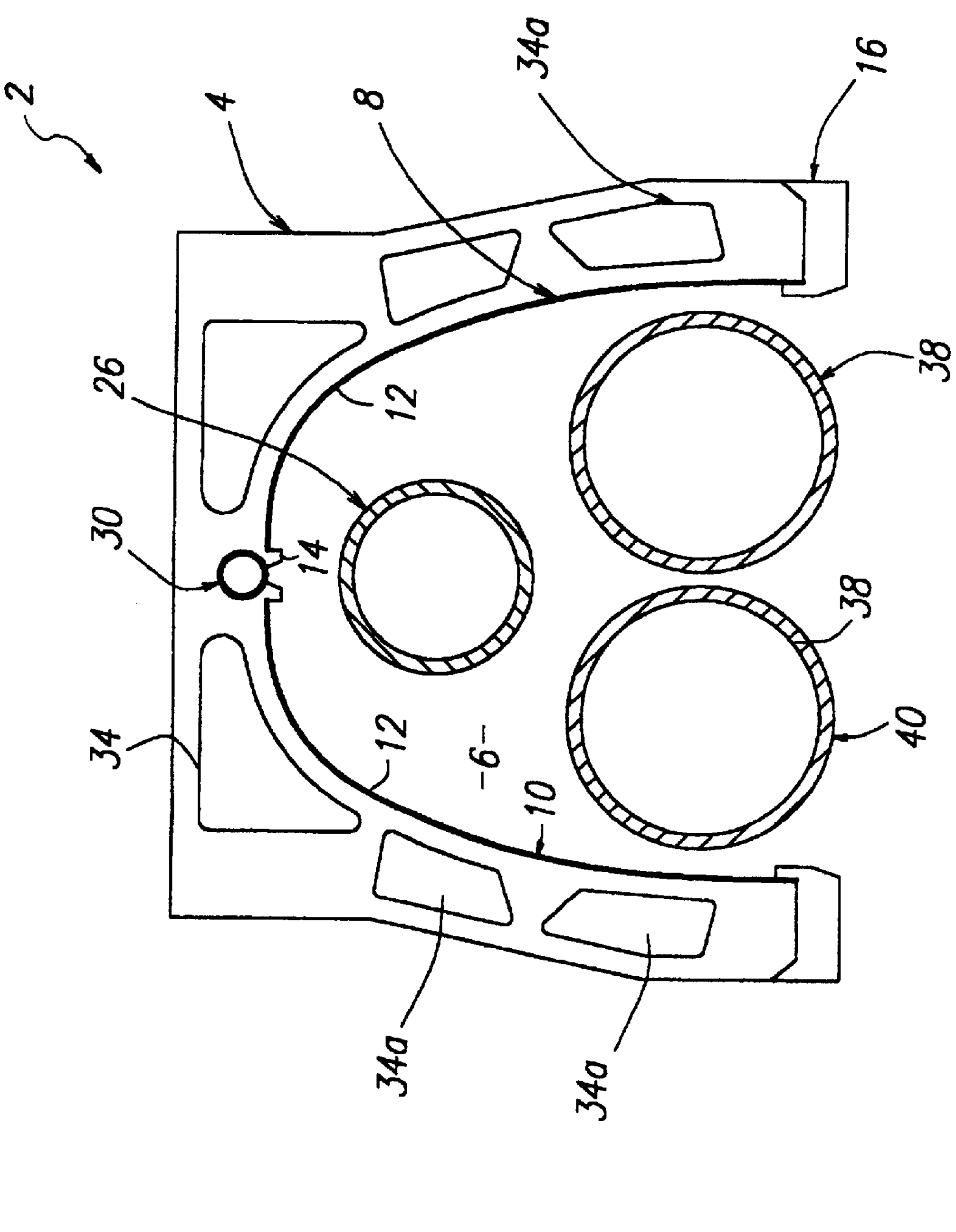
FIG. 1 is a front view of a lamp assembly in accordance with the invention.
Figure 3:
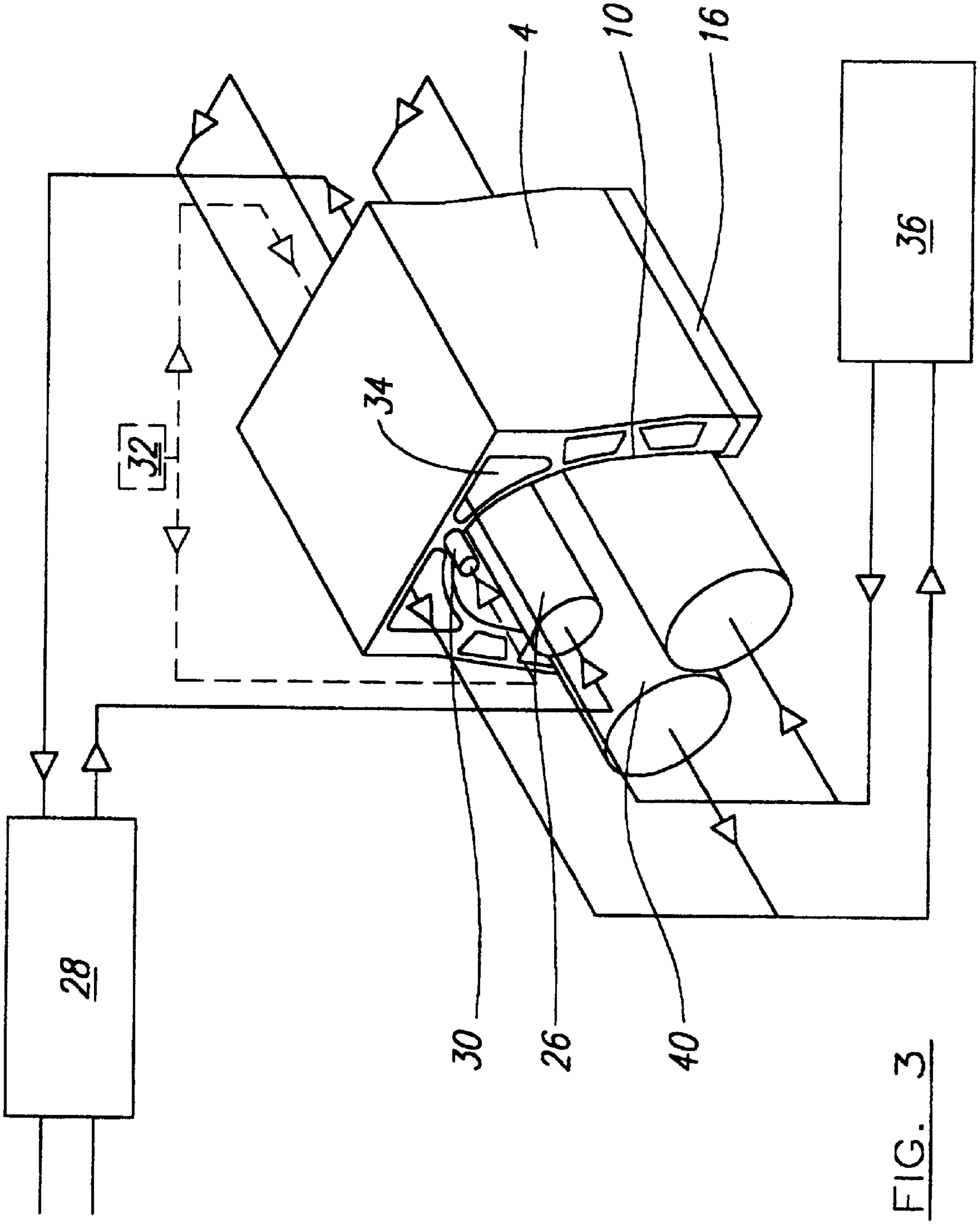
FIG. 3 is a schematic, perspective view of the assembly of FIG. 1 in operation.

The lamp assembly 2 comprises a reflector body 4 which is preferably made of extruded aluminum. The reflector body 4 has a cavity 6 with a continuously concave-curved surface 8 secured to which is a separate reflector 10 with a reflective surface of the same profile as the cavity 6.

The reflector 10 is formed from two reflector elements 12, each held between a flange 14 and a clamp 16. The reflector elements 12 comprise plates which are initially flat and which are conformed to the shape of the cavity 6 by the action of clamping in the position of FIG. 1.

Each clamp 16, see FIG. 2, is shaped to mate with the lower end of the reflector body 4 when connected thereto by a fastener 18. The clamp 16 includes a passage 20 for receipt of the head of the fastener 18. An upwardly extending flange 22 defines with the reflector body 4 a slot for receipt of one edge of a reflector element 12. As will be seen from FIG. 2, the flange 14 provided on the body 4 may also be shaped to provide a slot which assists in holding the element 12 during securement of the clamp 16.

The clamps 16 may be made "quick release" by fixing the fasteners 18 to the body 4 and then forming the clamps with an appropriately sized key hole cut-out 24. The clamp 16 can then be attached and detached simply by sliding them to bring the key holes 24 into and out of locking engagement with the fasteners 18.

The use of clamps ensures that the reflector elements 12 are pressed close against the ref lector body 4 and thus that cooling of that body 4 is effective to remove heat from the reflector elements 12. By effectively removing heat from reflector elements 12, the elements 12 do not deteriorate as quickly. This means that they need to be replaced less frequently. Moreover, when they are replaced only the elements 12 need to be replaced as opposed to an entire polished surface extrusion. Not only does this reduce production line down-time for the user, but in addition it greatly reduces the user's operating costs.

The reflector 10 serves to reflect radiation emitted from a lamp 26 which is an elongate tubular medium-pressure mercury vapor ultra-violet lamp. The lamp 26 has a central portion which emits radiation and end portions which are connected to a suitable power source 28 for energizing the lamp 26.

The lamp assembly 2 is both air-cooled and water-cooled. Air is used to cool the lamp 26 whilst heat is extracted from the body 4 by water. Compressed coolant air is supplied to a tube 30 extending through a bore formed in the reflector body 4 at the apex of the cavity 6 from a compressed air supply 32. The reflector body 4 also includes plural channels 34 extending longitudinally thereof for the circulation of liquid coolant from and to a liquid coolant supply 36. As shown in FIG. 1, the channels 34 are shaped and positioned such that coolant liquid flows adjacent the majority of the outer surface of the reflector 10. The channels **34*a* positioned to the sides of the reflector 10 have been found to be particularly beneficial as they help ensure that the surface temperature on the outside of the block 4 does not exceed acceptable limits, for example, 50° C. (122° F.) even with a lamp power of 500 Watts per inch (200 Watts per cm). They reduce or prevent heat radiation from the sides of the body 4 which, in turn, reduces or prevents heating of adjacent parts. In addition, the lower channels 34*a*, in the sense of FIG. 1, help maintain the ends of the body 4** cool which is an area which is particularly vulnerable to overheating.

Liquid coolant is also fed by the supply 36 to and from quartz tubes 38 to form filters 40. The cylindrical wall surfaces of the tubes 38 act as lenses and the liquid coolant simultaneously filters out infra-red radiation and cooperates with the tube walls to refract and focus radiation passing therethrough. Use of the filters 40, therefore, has advantages due to the filtering and focusing effects thereof and the additional cooling which they provide. However in some situations, filters may be undesirable or unnecessary and are not then used.

Figure 4:
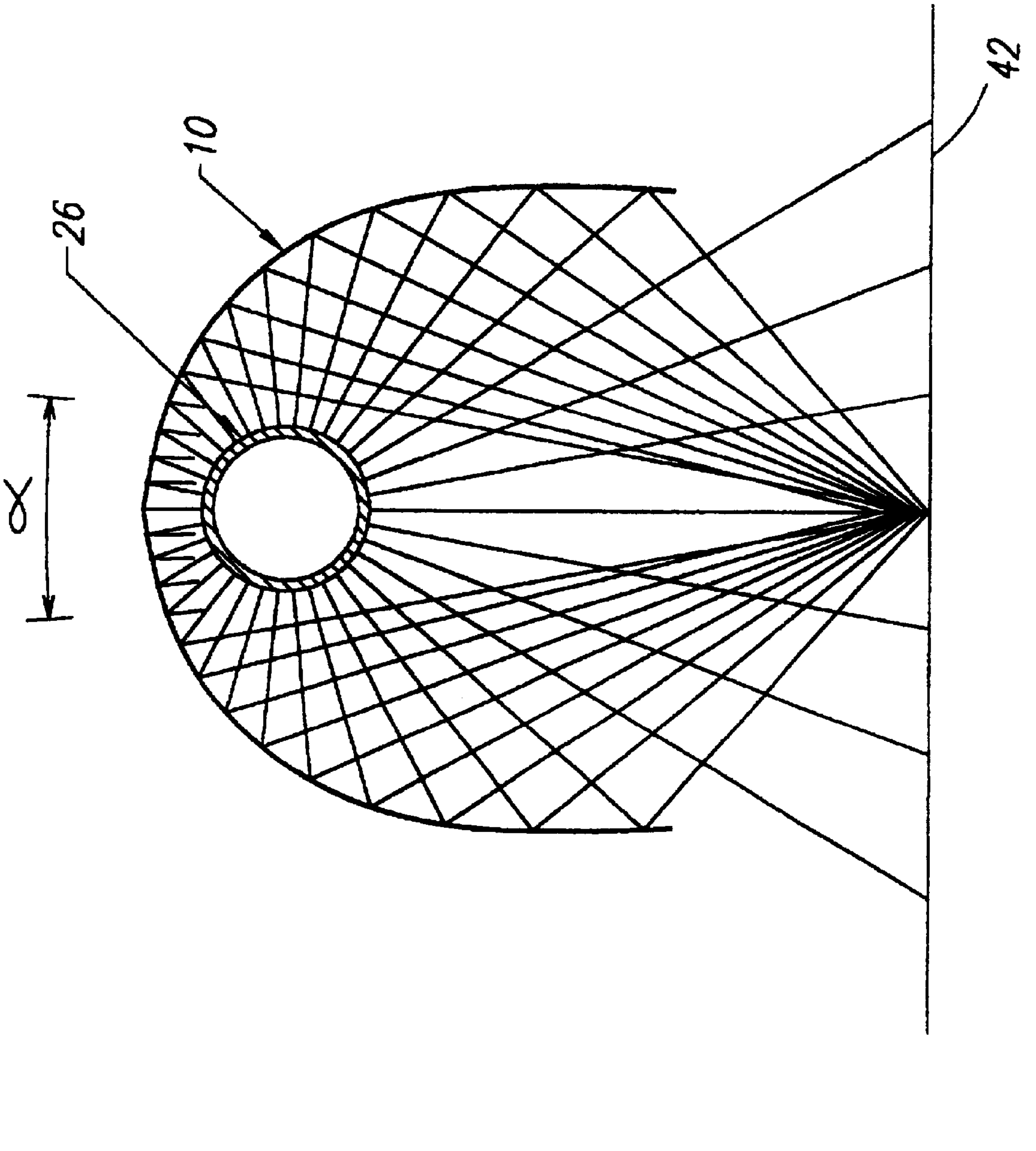
FIGS. 4 and 5 illustrate the ray pattern produced with prior art lamp assemblies.
Figure 5:
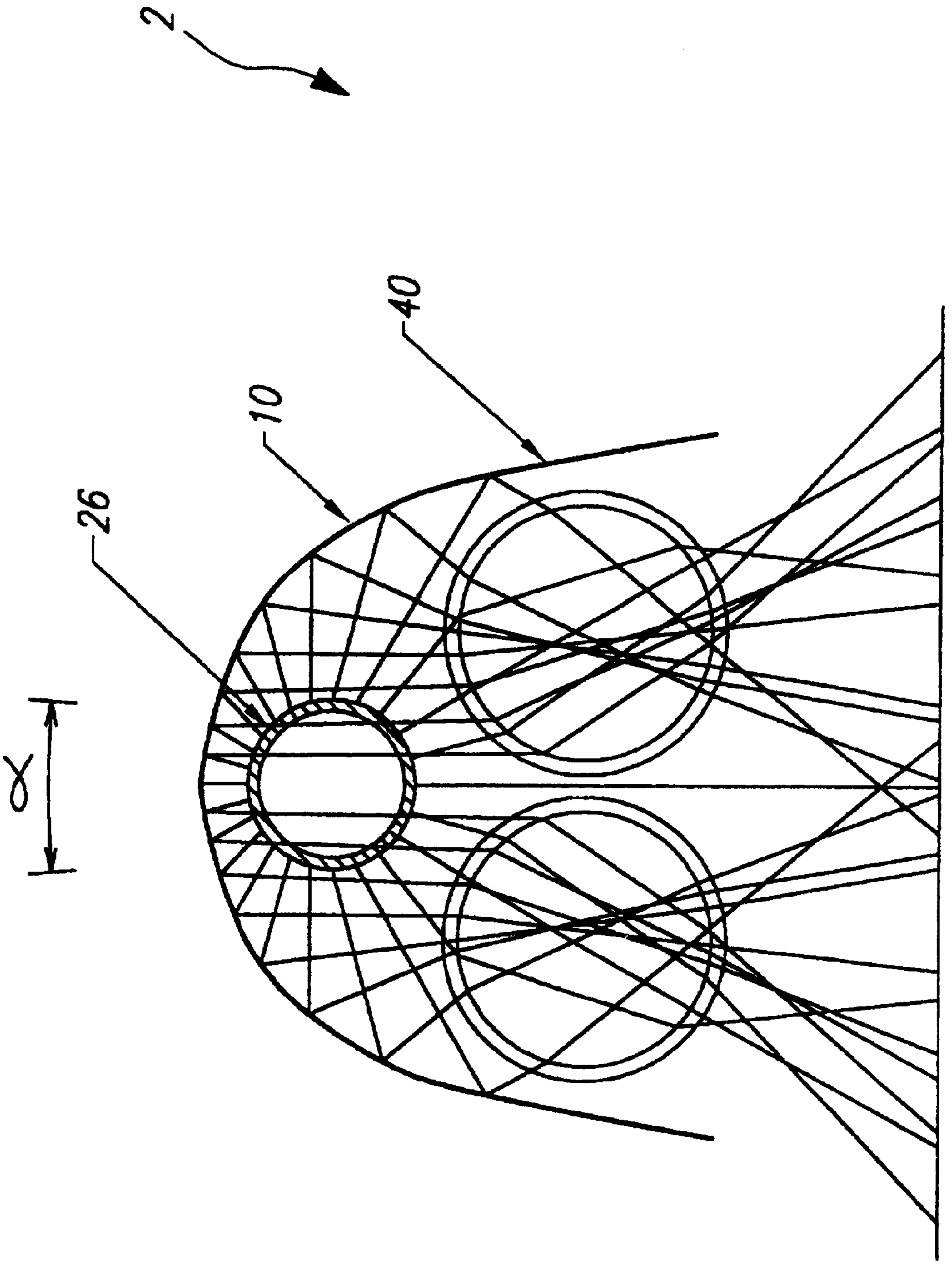

FIGS. 4 and 5 show the radiation light beam patterns produced with known light assemblies when unfiltered, FIG. 4, and filtered, FIG. 5. The reflector 10 of FIG. 4 has a reflective surface which is elliptical whilst the reflector 10 of FIG. 5 is parabolic.

Figure 8:
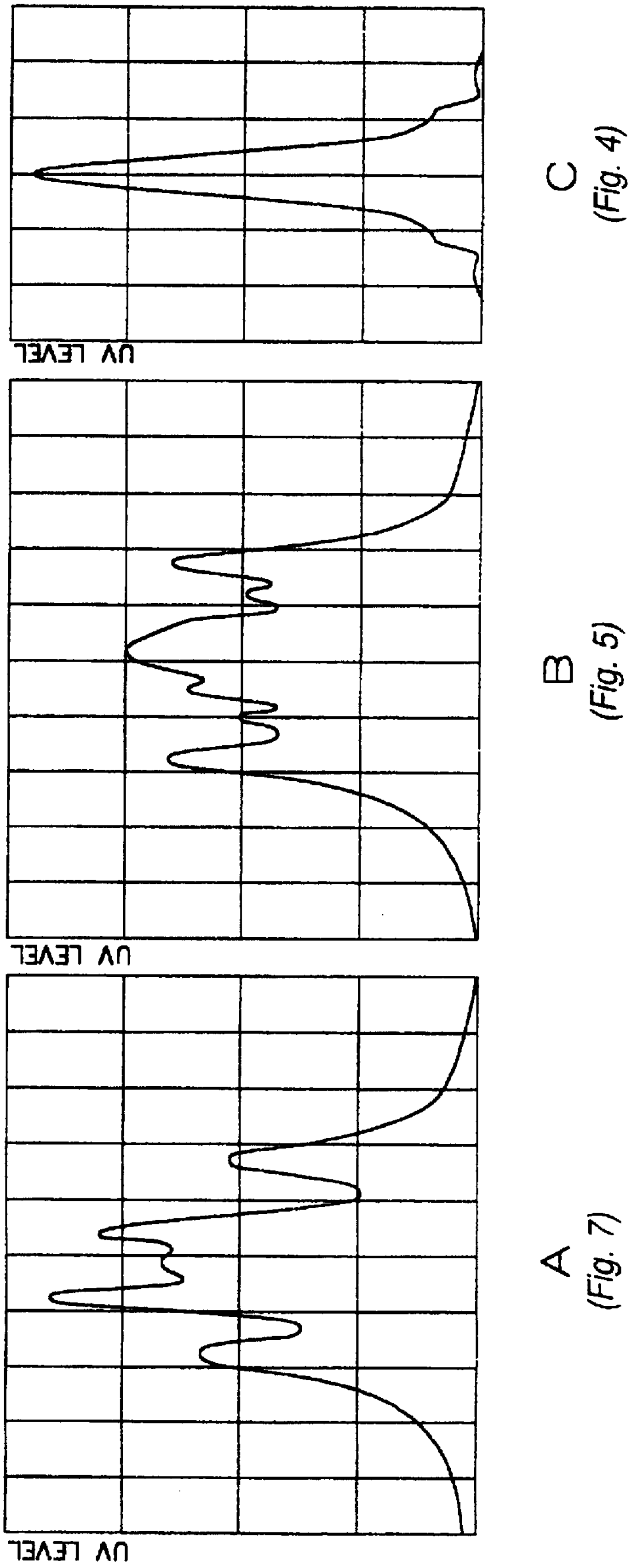
FIG. 8 comprises light intensity graphs resulting from the ray patterns of FIGS. 4, 5 and 7.

As FIG. 4 illustrates, with an elliptical reflective surface and no filtering and the lamp positioned as is usual at one of the elliptical foci, a concentration of radiation is produced at the other. In effect an irradiation line results which gives a very high energy over a narrow region of the substrate which is shown in FIG. 4 at 42. This energy peak can be seen in Graph C of FIG. 8.

FIG. 5 illustrates the different radiation beam pattern produced with a lamp assembly 2 having a parabolic reflective surface and filters 40. A line of high intensity is still produced below the lamp 26 from the reflected beams and those emitted directly downwards. The filters 40 focus the downward but angled beams to provide two additional concentrations of lower level. The resultant light intensity variation across the assembly 2 is illustrated in Graph B of FIG. 8.

It will be seen that with both the light assembly of FIG. 4 and that of FIG. 5, a significant proportion of the radiation emitted from the lamp 26 is reflected back onto the lamp 26. This results in a loss of available irradiation energy, the lost energy needlessly heating the lamp 26 which may adversely affect its operation and cause deterioration requiring its replacement.

With known arrangements, the angular range of radiation beams which are reflected back onto the lamp 26 is about 90°. With the particular known elliptical and parabolic reflector arrangements illustrated in FIGS. 4 and 5, the angular range $\alpha$ is, respectively, 86° and 82°, so that, respectively, 24% and 23% of the emitted radiation is lost.

Figure 6:
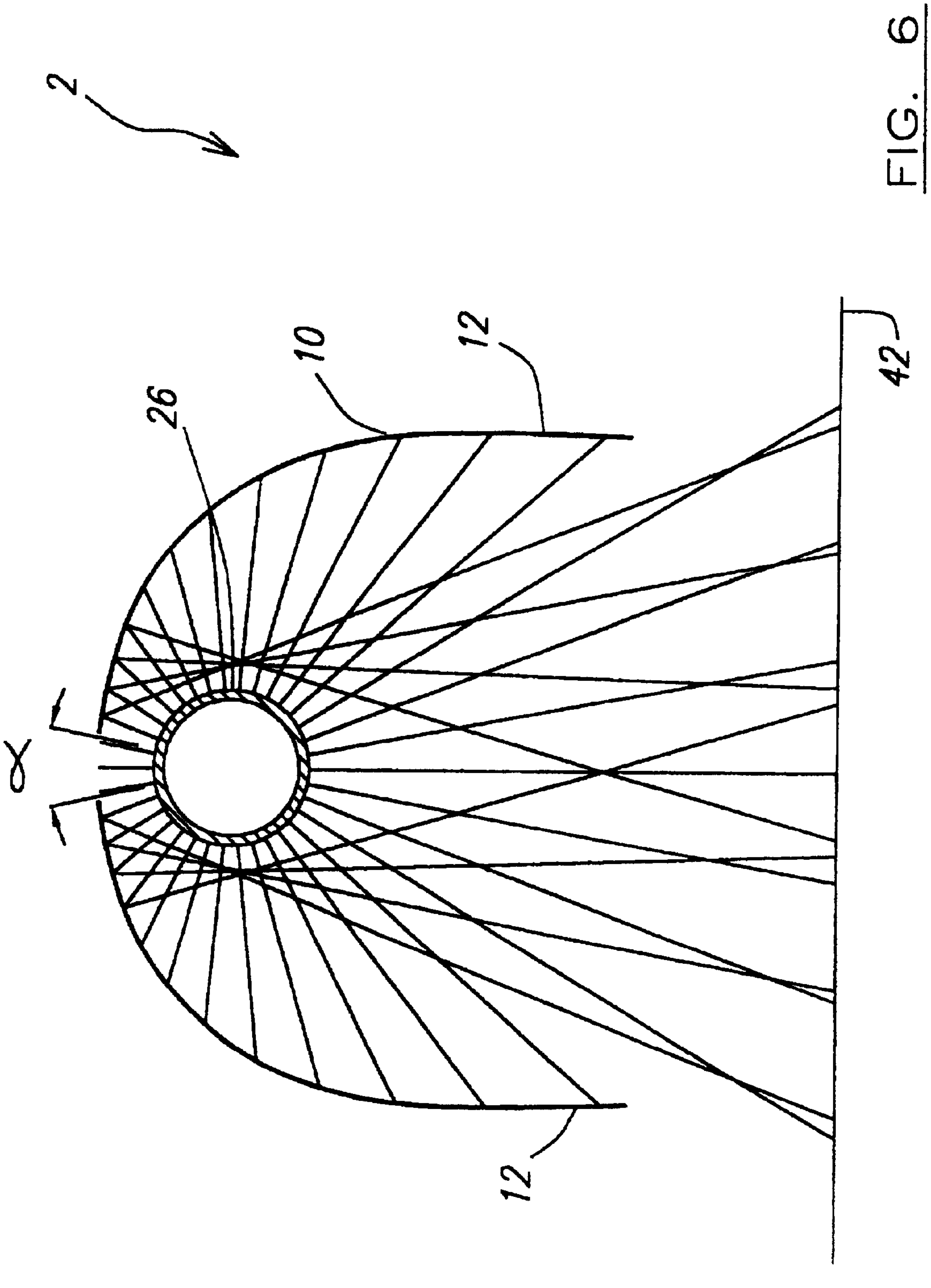
FIGS. 6 and 7 illustrate the ray pattern produced with the assembly of FIG. 1.

The reflector 10 of the lamp assembly 2 of FIG. 1 has a reflective surface which is shaped to reduce the amount of radiation reflected back onto the lamp 26 by at least 50%. As shown in FIG. 6, with the embodiment of FIG. 1, all radiation reflected from the reflector 10 is directed away from the lamp 26. The radiation which passes through the gap between the reflector elements 12 may be reflected back onto the lamp 26, however the consequent heating effect is much less than with known arrangements since the gap defines a much smaller angular range, being less than 36°, preferably 26° to 28°. The lost energy is, therefore, reduced to 7.2 to 7.7%.

The profile of the reflective surface of the reflector 10 of FIGS. 1 and 6 is also such that the radiation emanating from the upper portion of the lamp is focused on reflection at two focal points 44 positioned either side of the lamp 26. The focal points 44 act, as it were, as secondary radiation sources which have the effect of producing a wider region of relatively higher intensity.

Figure 7:
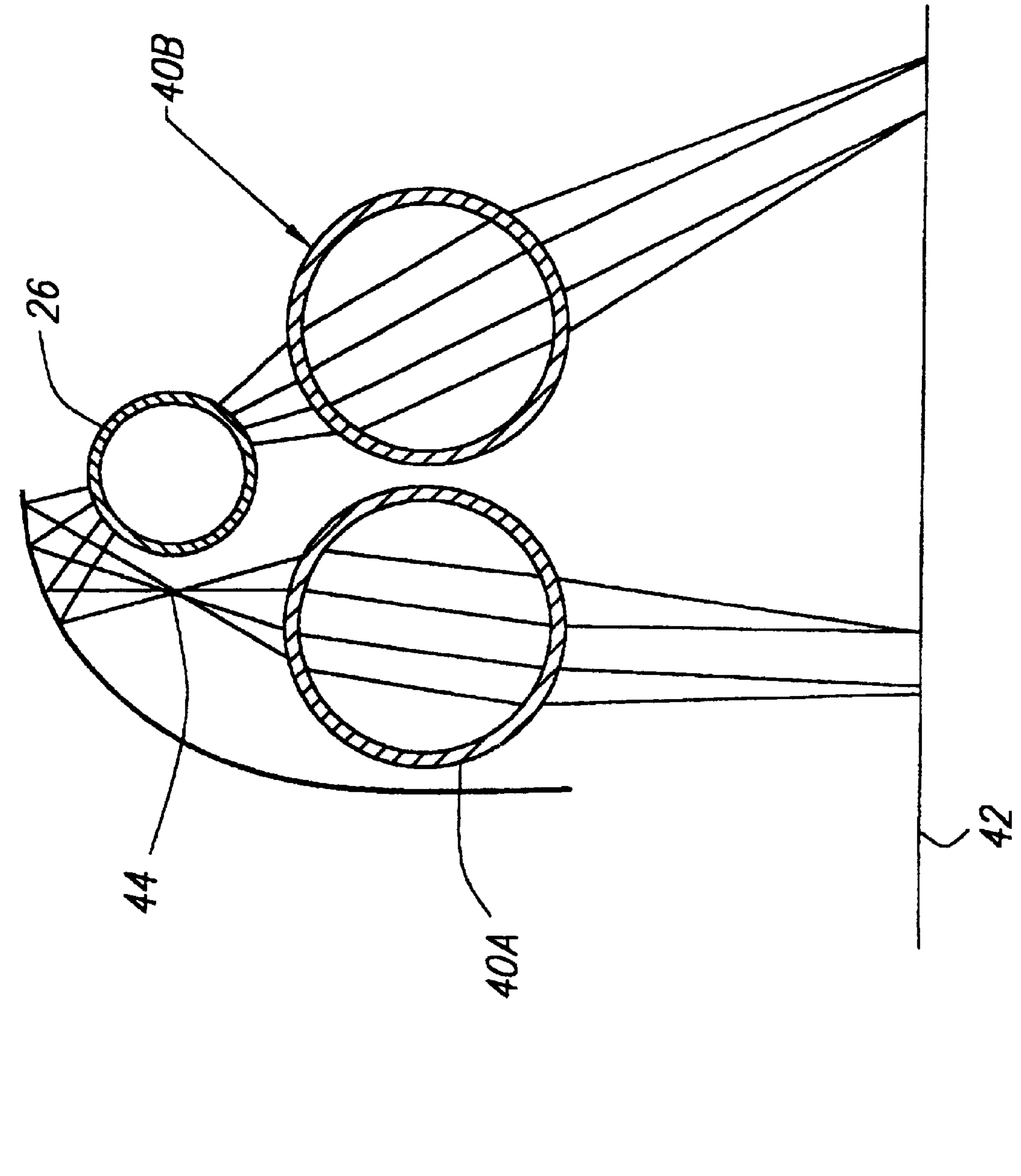

FIG. 7, which shows only one reflector element 12 for convenience, illustrates the effect of the two focal points 44 when the lamp assembly 2 is provided with filters 40A and 40B. Each filter 40 focuses radiation emanating from the focal point 44 thereabove to provide a first radiation concentration under the filter 40, as is illustrated with respect to filter 40A. In addition, each filter 40 focuses the radiation emanating from the bottom portion of the lamp 26 to provide a second concentration to the side away from the other filter 40, as is illustrated with respect to filter 40B. The result is four radiation intensity peaks as Illustrated in Graph A of FIG. 8.

Figure 9:
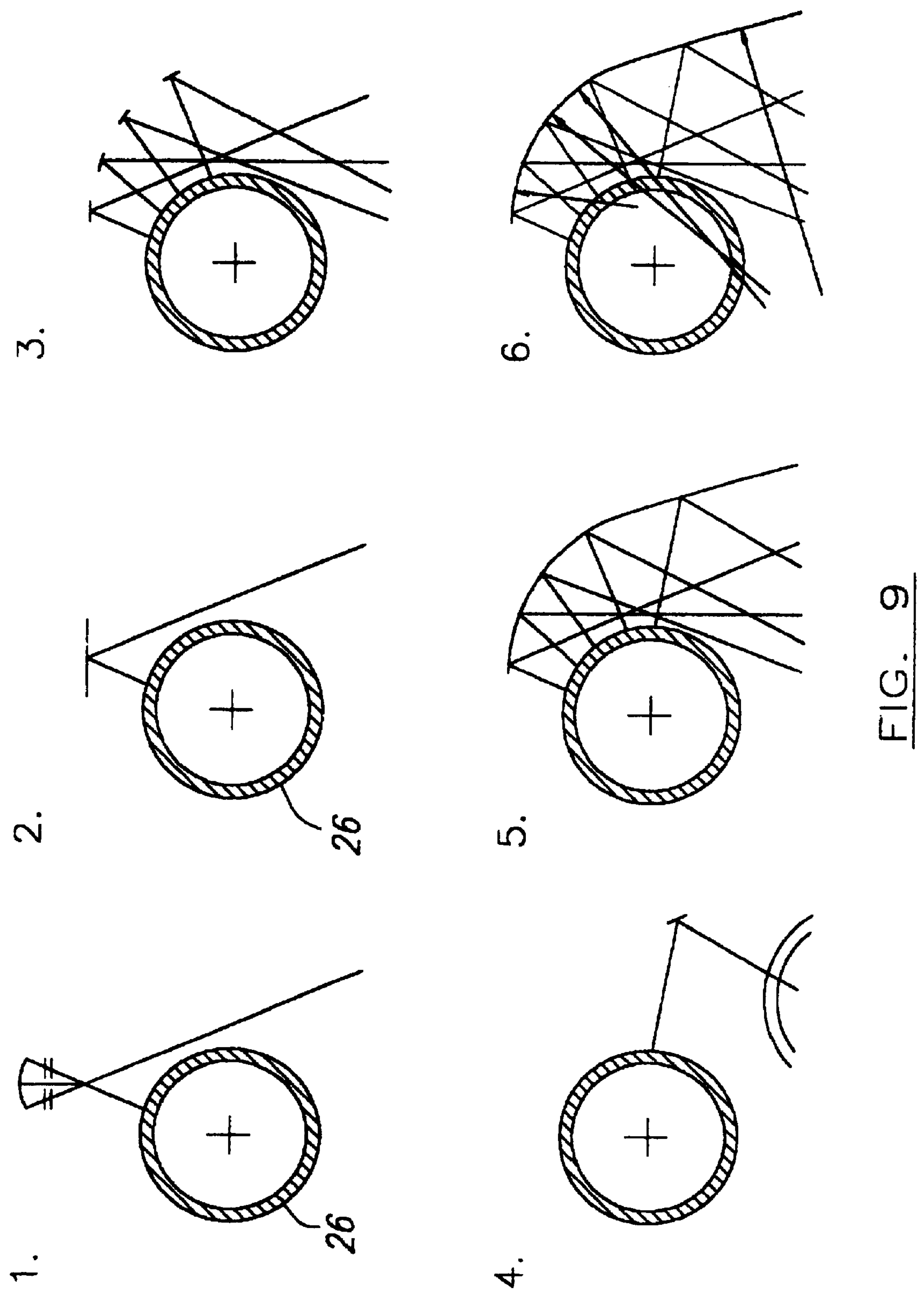
FIG. 9 is a series of views illustrating the steps of constructing the reflective surface of the assembly of FIG. 1.

The construction of a reflective surface profile of FIGS. 6 and 7 which achieves the above-described results is illustrated in FIG. 9. For each radiation ray emanating from the upper portion of the lamp 26, a reflected ray is drawn such that the reflected ray passes to the side of the lamp 26 (1). A facet is then drawn to create the desired reflection (2). The process is repeated for rays further around the lamp 26 (3). Facets are drawn for radiation rays emanating from the lower portion of the lamp such that the reflected rays pass through the filters 40 (4). The reflection facets are joined to form a profile (5). To provide a smooth profile a "best fit" curve is then produced (6).

Figure 10:
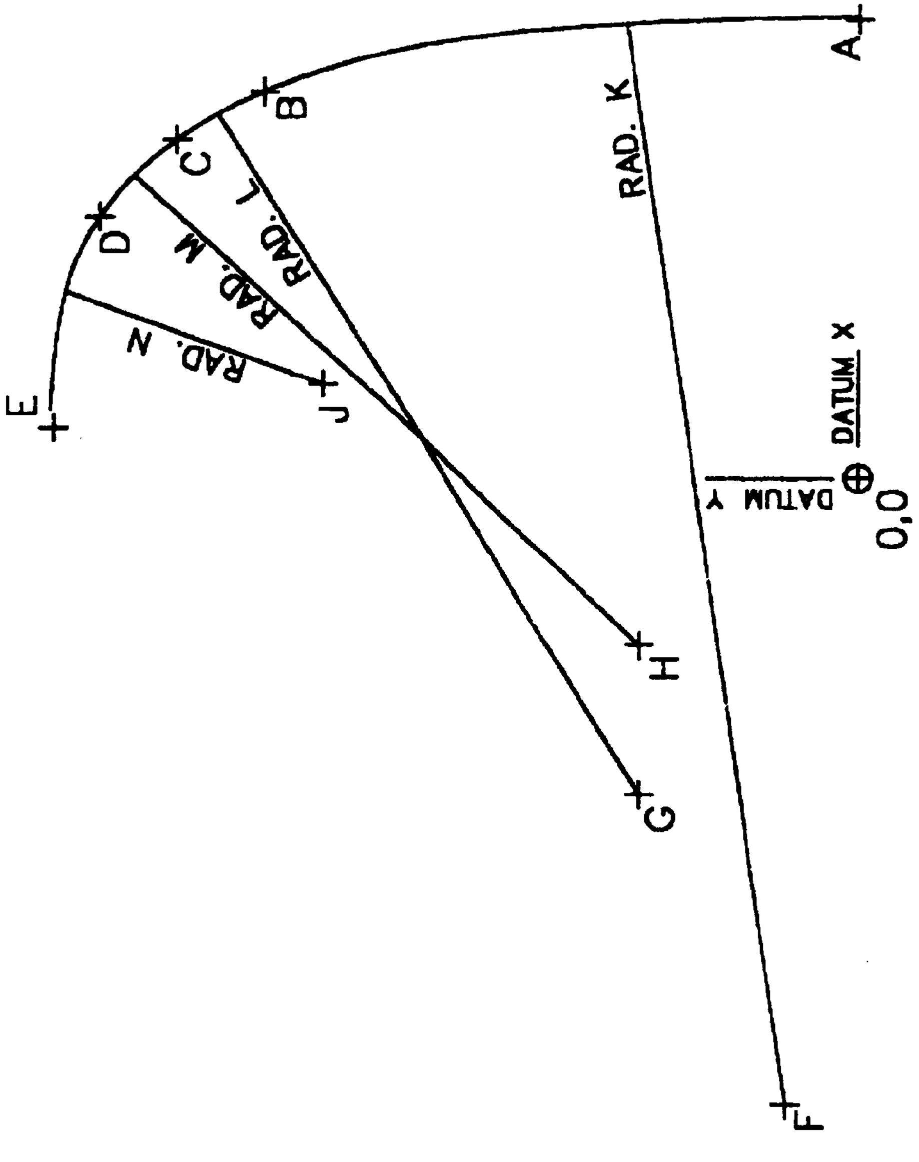
FIG. 10 illustrates an exemplary reflective surface profile.

One possible "best fit" curve is illustrated in FIG. 10. This comprises four arcs AB, BC, CD and DE with four different centers, F, G, H, J, and radii K, L, M and N. The positions of the points A, B, C, D, E, F, G, H and J are determined with respect to a datum for formation of the profile by shaping the cavity 6 of the reflector block 4 using CNC.

It will be appreciated that FIG. 10 is simply illustrative of one suitable profile generator and there are other ways of providing the "best fit" curve.

It will also be appreciated that the reflective surface profile not only reduces the amount of radiation reflected back on to the lamp but also maximizes filtering efficiency since it maximizes the amount of radiation which passes through the filters 40 either directly from the lower portions of the lamp 26 or via the focal points 44. In particular, in comparison to known arrangements, the amount of radiation which passes between the filters is reduced.

Figure 11:
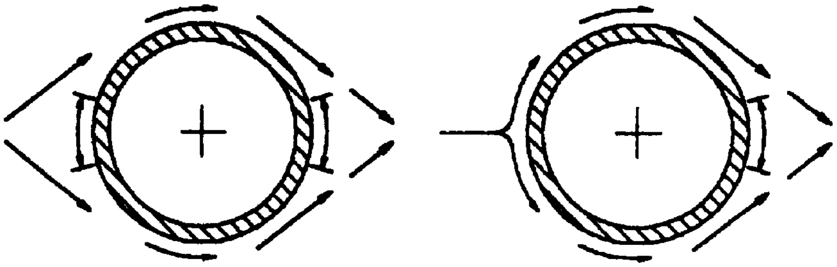
FIG. 11 comprises sketches illustrating the air cooling system of the lamp assembly of FIG. 1 and prior art air cooling systems.
Figure 11:
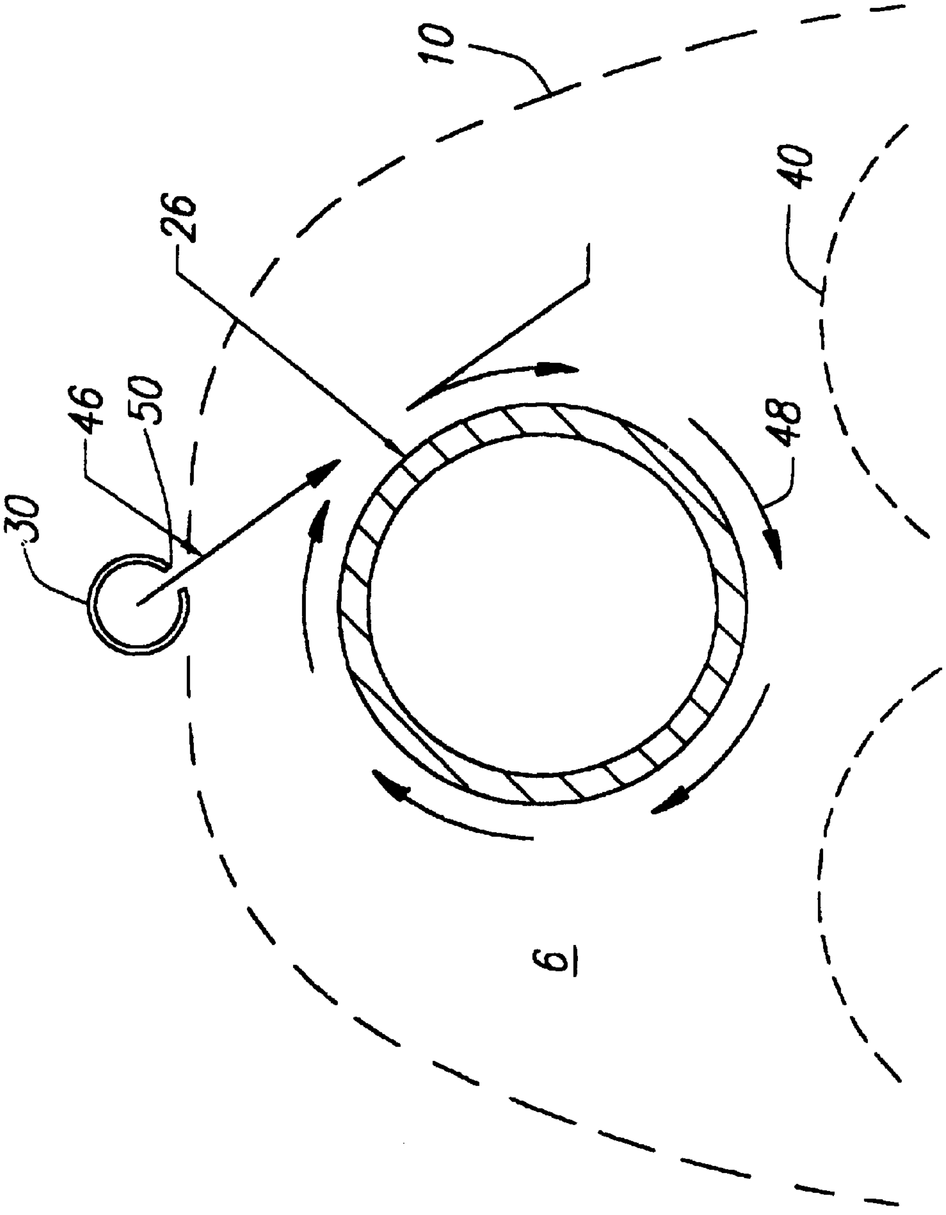

The reflective surface profile may also cause or contribute to the generation of an air vortex within the cavity 6, as illustrated in the main view of FIG. 11. As shown there, cooling air directed into the cavity 6, see arrow 46, has a rotary motion imparted thereto causing it to swirl and flow around the lamp 26, see arrows 48. The filters 40 are dimensioned and positioned to contribute to this effect.

It has been found that by supplying the cooling air in a single stream directed tangentially to the lamp 26, the vortex effect may be created but that this is not the case with two angled streams or a single stream directly down onto the lamp, as illustrated in, respectively, the upper and lower smaller views of FIG. 11. In both cases, air flows around part of the lamp 26 but there is no flow across an upper and a lower region in the first case and a lower region in the second.

The angled air stream may be created by use of an air tube 30 with an outlet opening 50 to one side of the symmetrical center line of the reflector body 4. Alternatively, or additionally, the opening in the reflector body 4 between the air tube 30 and the gap between the reflector elements 12 can be similarly offset. A preferred angle is 15°.

Cooling air flow completely around the lamp 26 gives much better cooling with disruption and breakage of the boundary layer adjacent to the surface of the lamp 26.

Overall, with the light assembly 2, cooling efficiency is optimized through the combination of the multiple coolant liquid channels 34, the clamping of the reflector elements 12 to the reflector body 4, the relatively large air tube 30 which it is possible to use because of the gap between the reflector elements 12 and the vortex generation in the stream of cooling air delivered by the air tube 30. In addition, less cooling power is required to deal with self-heating of the lamp 26 as this is reduced by the reflective surface profile.

At the same time, the reflective surface profile leads to a maximization of filtering efficiency when the assembly is filtered because more radiation passes through the filters than with known assemblies.

The result overall is a lamp assembly which can accommodate lamps of high power without overheating of the lamp, risk of damage to the substrate, the coating thereon, adjacent parts in the printing press or operators.

The design also provides a safer working environment for operators, and a more efficient production line which can operate at higher speeds, with less down-time, and less operating expense in consumable replacement parts.

We claim:

1. A lamp assembly comprising an elongate source of radiation, an elongate reflective surface partly surrounding the source for reflecting radiation thereon from the source onto a substrate for curing a coating thereon and two filters located between the source and the substrate wherein the reflective surface has a profile which is shaped to define two focal points for reflected light on either side of the radiation source and wherein the focal points are positioned with respect to the filters such that substantially all the light from the focal points passes to the substrate through the filters.

2. A lamp assembly as claimed in claim 1, wherein the reflector surface profile is shaped to direct a substantial portion of light reflected therefrom through the filters.

3. A lamp assembly as claimed in claim 2, wherein the reflector surface profile is substantially continuously concave curved and is shaped with respect to the source such that less than 10% of the radiation emitted from the source is reflected back thereonto.

4. A lamp assembly as claimed in claim 2, further comprising a reflector body having a cavity in which the source is located, the reflective surface being provided on the cavity surface.

5. A lamp assembly as claimed in claim 1, wherein the reflector surface profile is substantially continuously concave curved and is shaped with respect to the source such that less than 10% of the radiation emitted from the source is reflected back thereonto.

6. A lamp assembly as claimed in claim 5, further comprising a reflector body having a cavity in which the source is located, the reflective surface being provided on the cavity surface.

7. A lamp assembly as claimed in claim 1, further comprising a reflector body having a cavity in which the source is located, the reflective surface being provided on the cavity surface.

8. A lamp assembly as claimed in claim 7, wherein the reflective surface is provided by two reflector plates secured to the body either side of a symmetrical center line of the cavity.

9. A lamp assembly as claimed in claim 7, wherein the reflector body includes a plurality of channels for the passage of coolant liquid, at least one of which is positioned adjacent each of the cavity ends to cool the cavity sides.

10. A lamp assembly as claimed in claim 7, wherein the reflector body is fixed in position within a housing.

11. A lamp assembly comprising an elongate source of radiation, an elongate reflective surface partly surrounding the source for reflecting radiation from the source through an opening below the source onto a substrate for curing a coating thereon, means for supplying cooling air to the source from above the source and means for generating an air vortex such that cooling air flow is around the source.

12. A lamp assembly as claimed in claim 11, wherein the radiation source is tubular and the vortex generation means comprises an angled air supply passage for directing cooling air tangentially and to one side of the source.

13. A lamp assembly as claimed in either claim 12, wherein the vortex generation means comprises the reflective surface which has a profile configured to form the air vortex.

14. A lamp assembly as claimed in claim 12, wherein the vortex generation means includes at least one filter positioned between the radiation source and the substrate, each filter being shaped and located to generate the air vortex.

15. A lamp assembly as claimed in claim 12, further comprising a reflector body having a cavity in which the source is located, the reflective surface being provided on the cavity surface.

16. A lamp assembly as claimed in claim 11, wherein the vortex generation means comprises the reflective surface which has a profile configured to form the air vortex.

17. A lamp assembly as claimed in claim 16, wherein the vortex generation means includes at least one filter positioned between the radiation source and the substrate, each filter being shaped and located to generate the air vortex.

18. A lamp assembly as claimed in claim 16, further comprising a reflector body having a cavity in which the source is located, the reflective surface being provided on the cavity surface.

19. A lamp assembly as claimed in claim 11, wherein the vortex generation means includes at least one filter positioned between the radiation source and the substrate, the or each filter being shaped and located to generate the air vortex.

20. A lamp assembly as claimed in claim 19, further comprising a reflector body having a cavity in which the source is located, the reflective surface being provided on the cavity surface.

21. A lamp assembly as claimed in claim 11, further comprising a reflector body having a cavity in which the source is located, the reflective surface being provided on the cavity surface.

22. A lamp assembly as claimed in claim 21, wherein the reflective surface is provided by two reflector plates secured to the body either side of a symmetrical center line of the cavity.

23. A lamp assembly as claimed in claim 21, wherein the reflector body includes a plurality of channels for the passage of coolant liquid, at least one of which is positioned adjacent each of the cavity ends to cool the cavity sides.

24. A lamp assembly as claimed in claim 21, wherein the reflector body is fixed in position within a housing.

25. A lamp assembly comprising an elongate source of radiation, an elongate reflective surface partly surrounding the source for reflecting radiation from the source onto a substrate for curing a coating thereon, and a reflector body having a cavity in which the source is located, the reflective surface being provided on the cavity surface, wherein the reflective surface is provided by two reflector plates secured to the cavity surface either side of a symmetrical center line of the cavity and wherein the plates are secured by releasable clamps which cause the plates to conform to the profile of the cavity surface.

26. A lamp assembly as claimed in claim 25, wherein the reflector body includes flanges extending into the cavity, each reflector plate being secured with one edge abutting a flange and an opposite edge abutting a clamp attached to an end of the reflector body cavity adjacent the substrate by tightenable fastening means.

27. A lamp assembly as claimed in claim 26, wherein the reflector body includes a plurality of channels for the passage of coolant liquid, at least one of which is positioned adjacent each of the cavity ends to cool the cavity sides.

28. A lamp assembly as claimed in claim 26, wherein the reflector body is fixed in position within a housing.

29. A lamp assembly as claimed in claim 25, wherein the reflector body includes a plurality of channels for the passage of coolant liquid, at least one of which is positioned adjacent each of the cavity ends to cool the cavity sides.

30. A lamp assembly as claimed in claim 29, wherein the reflector body is fixed in position within a housing.

31. A lamp assembly as claimed in claim 25, wherein the reflector body is fixed in position within a housing.

* * * * *